(No Model.) 4 Sheets—Sheet 1.

J. H. MITCHELL.
MACHINERY FOR ORNAMENTING CAKES, &c.

No. 271,898. Patented Feb. 6, 1883.

Witnesses:
J. Walter Douglass.
S. H. Poole

Inventor:
J. Henry Mitchell
By W. C. S. Riley
attorney (No Model.)

J. H. MITCHELL.
MACHINERY FOR ORNAMENTING CAKES, &c.

No. 271,898.

4 Sheets—Sheet 2.

Patented Feb. 6, 1883.

Witnesses:
J. Walter Douglass
S. H. Poole

Inventor:
J. Henry Mitchell
By W. C. Wiley
Attorney (No Model.) 4 Sheets—Sheet 3.
J. H. MITCHELL.
MACHINERY FOR ORNAMENTING CAKES, &c.
No. 271,898. Patented Feb. 6, 1883.
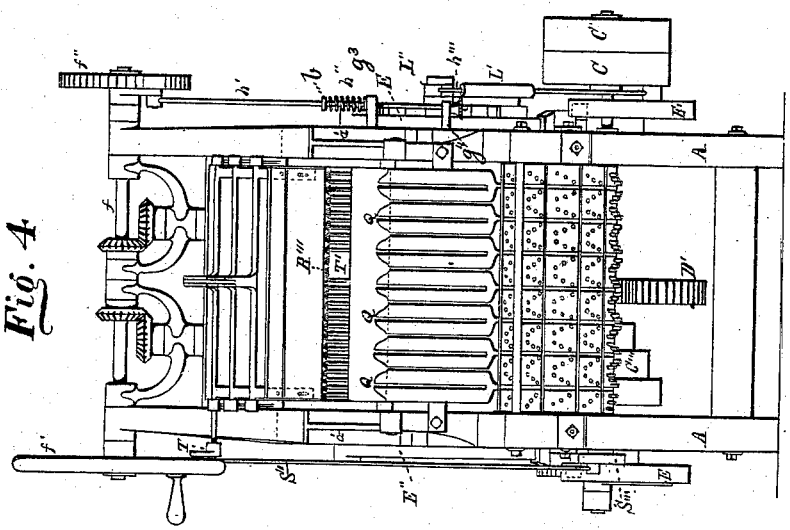
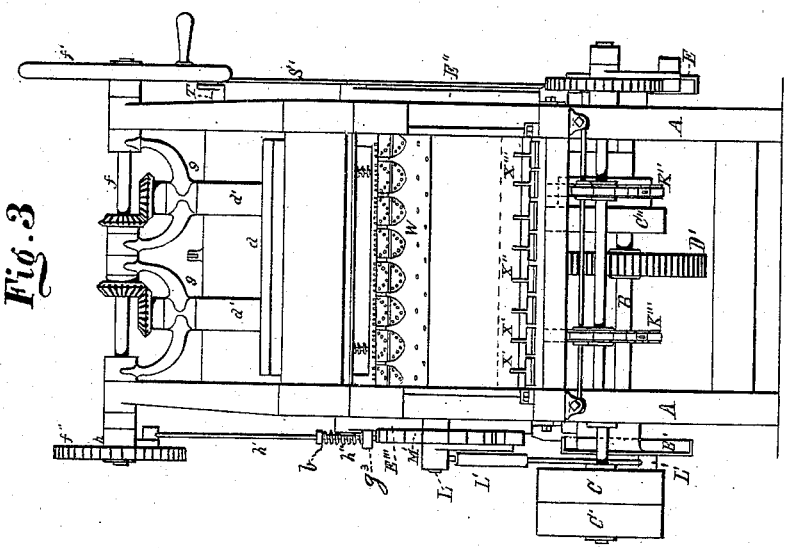
Witnesses:
Inventor:

(No Model.) 4 Sheets—Sheet 4.
J. H. MITCHELL.
MACHINERY FOR ORNAMENTING CAKES, &c.
No. 271,898. Patented Feb. 6, 1883.
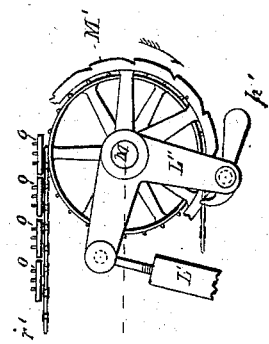
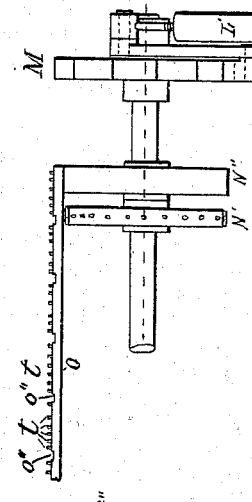
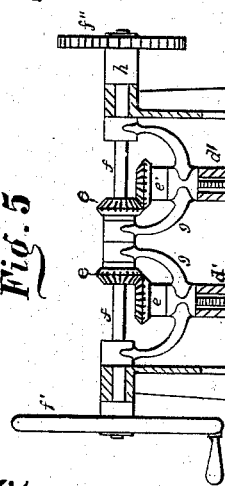
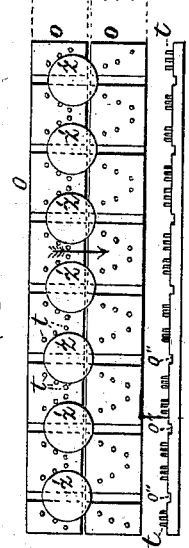
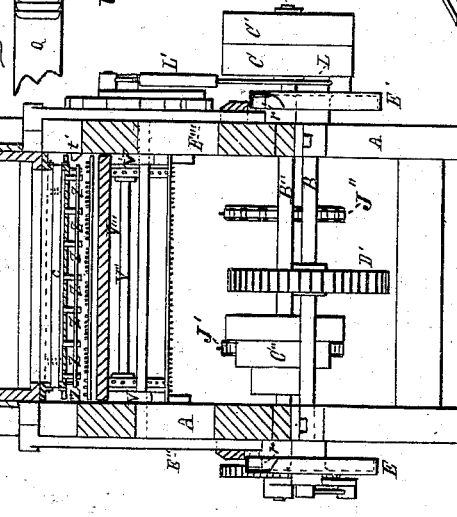
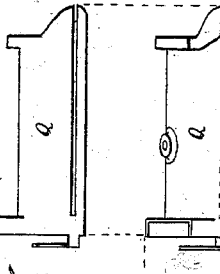
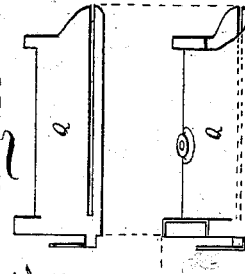
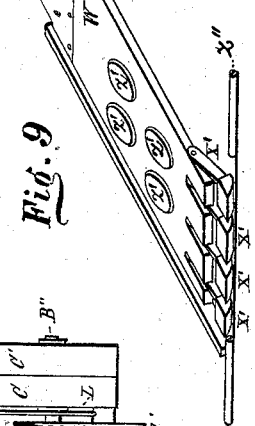
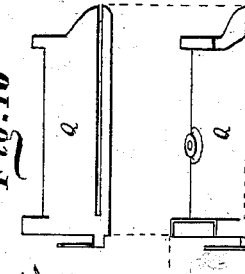
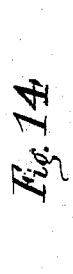
Witnesses:
J Walter Douglass
S. K. Dodge
Inventor:
J Henry Mitchell
By Ht. C. Paley
attorney
N. PETERS, Photo-Lithographer, Washington, D. C.

UNITED STATES PATENT OFFICE.

J. HENRY MITCHELL, OF PHILADELPHIA, PENNSYLVANIA.

MACHINERY FOR ORNAMENTING CAKES, &c.

SPECIFICATION forming part of Letters Patent No. 271,898, dated February 6, 1883.

Application filed November 20, 1882. (No model.)

*To all whom it may concern:*

Be it known that I, J. HENRY MITCHELL, of the city and county of Philadelphia, in the State of Pennsylvania, have invented certain new and useful Improvements in Machinery for Ornamenting Cakes, &c.

The following is a specification of my said improvements, reference being had to the accompanying drawings.

My improvements relate to that class of machines wherein an endless belt is used to feed along the already formed cakes beneath ornamenting-nozzles, which deposit upon them the ornamenting material, and the object of my invention is to effect all the operations automatically.

To that end my improvements consist in the following main features: First, in the use of a hopper and combinations thereof with various devices to supply the cakes to and distribute them upon the feeding-belt; second, in the combination, with the belt, of several devices for accurately centering the cakes beneath the ornamenting-nozzles, such centering being necessary, both in longitudinal and lateral directions with respect to the belt's travel, and being efficient with cakes of various diameters; third, the combination, with the belt, of means for effecting the constant removal of the ornamented cakes therefrom and their transfer at proper intervals to the baking-pans, which are supplied upon a second belt for that purpose. As will be seen hereinafter, the devices thus grouped under these main divisions consist of numerous combinations of parts, the structural features of which may be varied by the substitution of known equivalents without affecting their identity of purpose and operation in such combination.

Figure 1:
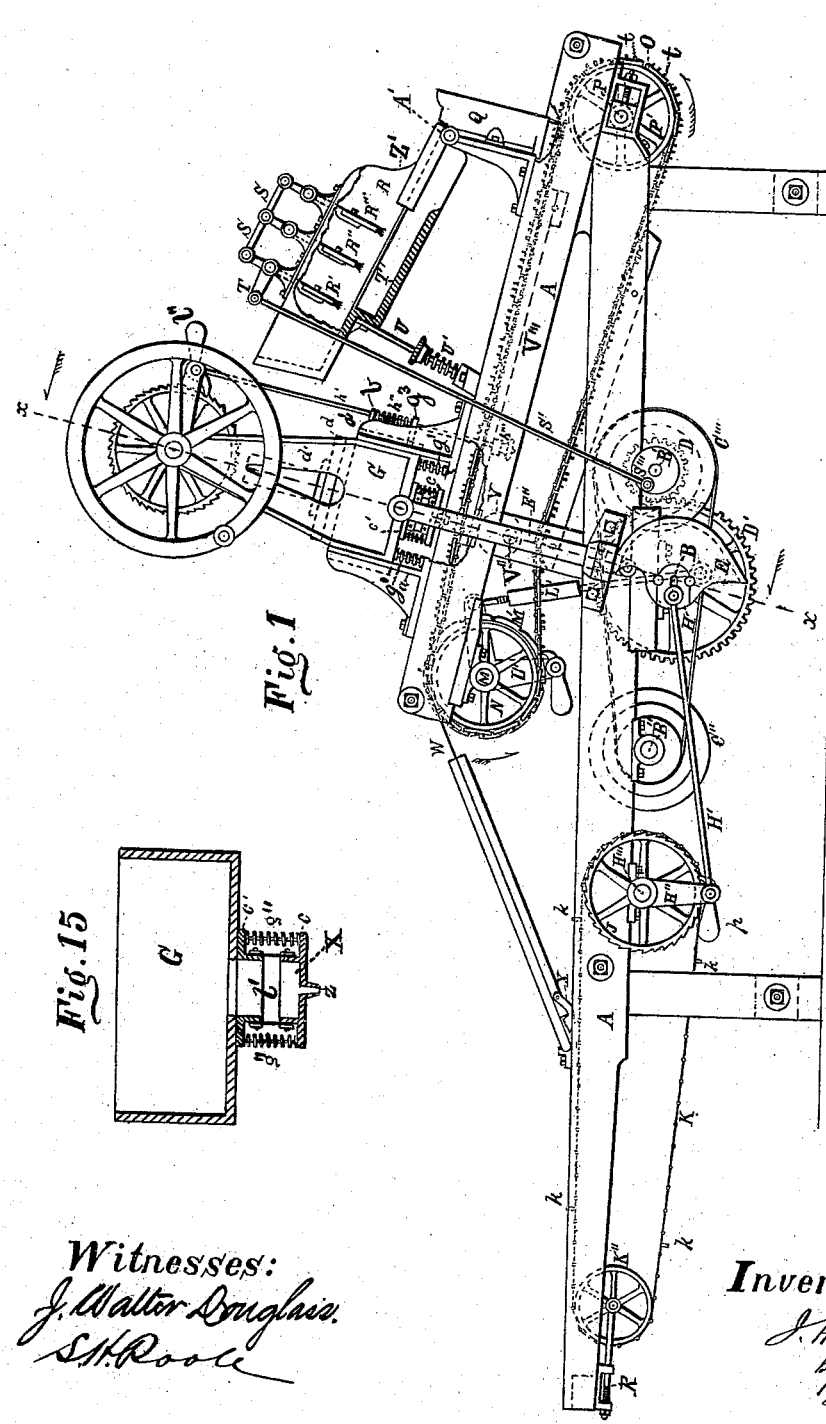
Figure 2:
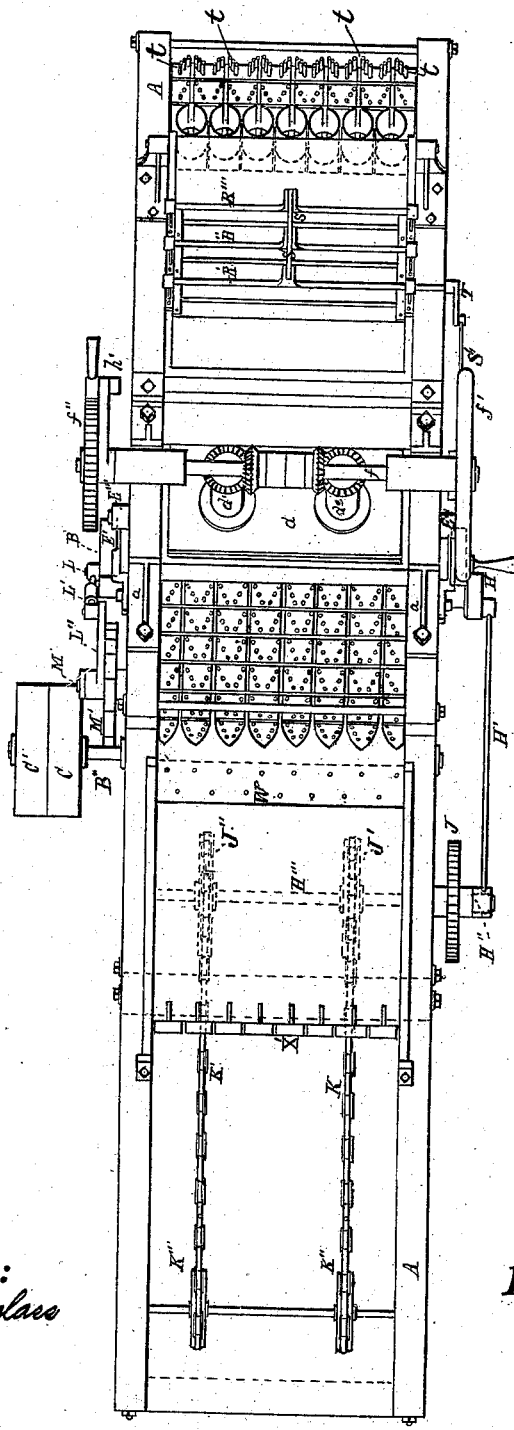

Reference being had to the accompany drawings, Figure 1 is a side elevation of the machine. Fig. 2 is a plan. Figs. 3 and 4 are end elevations, the former showing the end which in Fig. 1 is to the left, and the latter the end which is to the right. Fig. 5 is a section through lines $x\ x$, shown in Fig. 1. Figs. 6, 7, 8, 9, 10, 11, 12, 13, 14, and 15 are views of various parts in detail, which will hereinafter be more particularly adverted to.

A represents the frame of the machine, which supports in proper bearings the driving-shaft B, from which all motions of the machine but one are taken. On either side of the shaft B are two other shafts, B' B'', which are also mounted in bearings on the frame A. Upon the extreme end of the shaft B'' are two pulleys, C and C', the former loose on the shaft and the latter fast. Upon the same shaft B'', close to one of its bearings, is fastened a cone-pulley, C'', with three or more different diameters for change of speed. In line with this pulley C'', and upon the other shaft, B', is fastened another cone-pulley C³, and the power is transmitted by a belt fitting all three changes of speed or steps on the two cone-pulleys.

In the center of the shaft B' is fastened a pinion-gear, D, which meshes with another gear, D', keyed to the main driving-shaft B, which has also keyed or fastened upon its opposite ends two cams, E and E', respectively.

These cams have an internal scroll motion, which imparts to the two sliding connecting-rods E'' and E'''—one on each side of the machine—an up-and-down motion, by means of rollers $r\ r$, upon the lower ends of said rods, and bearing against the inside curve of the cams E and E'. These two connecting-rods E'' and E''' work or slide in bearings fastened to frame A, and are connected at their upper ends to the material-box G.

Upon the outside of the cam E, Figs. 1 and 2, is fastened a crank-pin, H, adjustable, so as to give a long or short stroke, as may be desired, and to this crank-pin H is connected a rod, H', which works the swinging arm H''. This arm H'' swings freely upon the end of the shaft H''', alongside of the ratchet-wheel J, which it turns by the action of the pawl $p$, working upon the swinging arm H'', and engaging in the teeth of the ratchet-wheel J. The wheel J is keyed to the shaft H''', as are also two chain-wheels, J' and J'', respectively. Suspended around the chain-wheels J and J' are two endless chains or pan-conveyers, K and K', provided with studs or pins $k$ at regular intervals, which engage with and hold the pans or trays for receiving the ornamented cakes. These pan-conveyers K and K' are supported by the tightening-wheels K'' and K''' respectively, having slide-bearings and screw attachments R, fastened to the extreme end of the frame A.

Upon the outside of the cam E' is fastened a crank-pin, L, and working freely upon it is a connecting-rod, L', provided with a sleeve-nut for lengthening and shortening it, the object of which will be hereinafter described. The rod L', at its other end, is connected to the bell-crank L'', (see Fig. 7,) swinging upon the extreme end of the shaft M, which works in bearings upon the frame A. Keyed to this shaft M is a ratchet-wheel, M', divided into ten equal sections. These sections or teeth engage with a pawl, p', working upon the other arm of the bell-crank L'', and as the stroke of the crank-pin L is equal to one of the sections of the ratchet-wheel M' every turn of the shaft B will turn the ratchet-wheel M' one-tenth of a revolution in the direction of the arrow.

Upon the shaft M are keyed two chain-wheels, N and N', Figs. 1 and 6, and on the outside of each, working loosely upon the same shaft, is a pulley, N'', for guiding and holding the sectional belt O. The construction of the belt O is shown in Figs. 8, 11, and 12. It consists of a series of long rectangular plates, o, (shown in plan view in Fig. 8, in front elevation in Fig. 11, and in cross-section in Fig. 12,) arranged transversely to the length of the belt, and secured to endless chains r', passing over the chain-wheels N and N' and the similar chain-wheels P' and P''. The latter are keyed fast to the shaft P, which has sliding bearings mounted upon the frame A, with screw attachments for tightening the chains r'. Ten sections of this belt O are equal to the circumference of the chain-wheels N and N', P' and P'', and as the ratchet-wheel M' is divided into ten sections also one motion of the ratchet-wheel will move the belt O one section forward with every revolution of the shaft B. Each plate o has a series of transverse grooves, o'', Fig. 8, which form continuous longitudinal grooves or slots throughout the sectional belt. These grooves correspond in number and position with the cake-holding tubes Q. These tubes Q are shown on an enlarged scale in Figs. 10 and 14. Their diameter is slightly greater than that of the cakes to be ornamented, and they are provided with pendent stops or fingers q, which extend laterally across their lower ends at a distance below the bottom slightly exceeding the thickness of the cakes. The tubes Q are mounted at one end of the machine, and are slightly inclined, as shown, each being located so that its finger q depends into one of the slots o'' of the belt O, as shown in Fig. 13. Thus when the tubes are filled with cakes the bottom cake of each column is suspended just below the tube and just above the sectional belt O. Upon each side of the slots o'' of this belt O are successive rows of pins or studs t, arranged at an angle of thirty degrees from the side of the slot, starting from the extreme rear edge of each section of the belt. The rows of studs thus open forward in the line of travel of the belt O (indicated by the arrow in Fig. 8) at an angle of sixty degrees with each other. The studs t are low enough to pass under the tubes Q, as shown in Fig. 13, and in passing will pull the lower cake from under the vertical column in the tubes. In so doing the cakes z' will be centered and held securely between the rows of pins or studs t, and as the height of the tubes Q is not more than the thickness of one cake from the belt O it is impossible to take more than one from under each of the tubes. The tubes Q are slotted from the top very nearly to the bottom, as shown in Fig. 10, for arranging the cakes, if they should become jammed or dislocated by broken pieces. An inclined hopper, Z', Fig. 1, is suspended above the tubes Q, and provided with three swinging brushes, R' R'' R''', extending from side to side, swinging together by the action of the connecting-rods S, which connect the three together at the top. The brushes are journaled at their extreme ends to the sides of the hopper Z', and are provided with slotted bolt-holes for raising or lowering the brushes, as may be desired, for the thickness of the cakes passing under them. The brushes R' R'' R''' are located at different heights from the bottom of the hopper Z', the distance of the brush R' above the bottom being equal to the thickness of three cakes, R'' of two cakes, R''' of one cake. The brushes all take the swinging motion from the shaft B' through the crank S''', connecting-rod S', and swinging crank T, secured to the brush R', at right angles thereto. The bottom of the hopper Z' under the brushes is slotted or perforated, so that the dust and crumbs of the cakes may be brushed off and fall through into the box T'' below. The inclination of the hopper Z' is regulated by a hand-screw, U, fastened to its bottom and resting upon a spring, U', which in its turn rests upon a cross-brace fastened to the frame A. The object of this spring U' is to give a jumping motion to the hopper Z', simultaneous with the action of the brushes R' R'' R'''. The hopper Z' is journaled to the frame A at A' to allow this motion freely. The sectional slotted belt O passes forward up the incline of the frame A, and under the material-box G, and is adjustable at any desired distance from this box G to suit the thickness of the cakes to be ornamented. This is accomplished by means of two cams, V and V', Fig. 5, located upon each side, close to the frame A, and fastened to a shaft, V'', which has its bearings in the frame A. The rotation of this shaft in one direction or the other will lift or drop a table or platform, V''', resting upon the cams V and V', and secured or journaled at the other end to the frame A. Upon this table V''' the belt O is supported, and is accordingly raised or lowered at the point immediately below the box G. The intermittent forward motion of the belt O is so timed that it will stop and locate each row of cakes centrally under the nozzles of the material-box G. This is effected by lengthening or shortening the screw-connecting rod L', before mentioned. Cakes of small diameter will require this rod to be made longer than those of larger diameter, as the centers of the small cakes are not so far ahead of the apex of the angle of sixty degrees, formed by the pins $t$, and it will therefore be necessary to make the belt O take a relatively more forward position than if the cakes were larger. It will thus be seen that this sectional grooved belt O will center cakes of any diameter positively under the ornamenting-tubes, as all the rows of pins $t$ adjacent to each groove form a line of angular receptacles traveling in a true line toward each of the ornamenting-tubes, and stopping and centering cakes of any diameter under each nozzle in position to be ornamented. The slots or grooves $o''$ of the sectional belt O are a second time utilized in taking off the ornamented cakes from the belt as it passes toward the stripper-plate W, Figs. 1 and 9. This plate W is provided with a number of fingers, $W'' W'' W''$, resting in the grooves $o''$ of the belt O, below the surface occupied by the cakes, and as the belt travels along the fingers $W''$ pass in under the center of the cakes. The stripper-plate W has enough incline to make the cakes slide freely down upon it by their weight. The bottoms of the grooves $o''$ in each of the plates $o$ of the belt O are curved, as indicated in the sectional projections of Fig. 8, and as the plates $o$ pass over the pulleys N and N' the curved bottoms of the grooves form a true circular slot, in which rest the fingers $W''$, $W''$, and $W''$ of the stripper-plate W. Upon the lower part of this plate W are journaled a number of stop-fingers, $x' x' x' x'$, Figs. 3 to 9, which are made to lift and fall freely, and when lifted make a positive stoppage of the sliding cakes by forming a step or projection across the surface of the stripper-plate W. This only occurs when the raised rim $z''$ of the pan or tray is passing under and lifting them up, and after it has passed they fall and allow the cakes to slide freely into the pan or tray, which is fed along fast enough to be filled all over with ornamented cakes. The material-box G slides up and down in bearings $a a'$, mounted upon the frame A. Beneath the box G are four springs, $g'$, which bear up against it in such manner as to raise it on the upward stroke of the connecting-rods $E''$ and $E'''$.

To the bottom of the material-box G is fastened a compressing-chamber, X, Fig. 15, composed of upper and lower plates, $c' c$, respectively, joined or connected by a band of sheet-rubber or other pliable material, $l'$, which allows the chamber to be compressed or elongated. In the lower plate, $c$, are the ornamenting-nozzles Z, in line with and directly over the angles formed by the pins $t$, which hold and center the cakes upon the endless belt O. The nozzle-plate $c$ projects laterally beyond the sides of the chamber X, as shown in Fig. 5, and comes in contact with the projections $t'$ on the frame A, which keep the nozzles from striking into the cakes. On the downward stroke of the box G and chamber X, the plate $c$ being in contact with the projections $t'$, the material within the chamber is compressed as the nozzle-plate is stopped, while the upper plate, $c'$, continues its descent with the material-box G. This compression causes a flow of the ornamenting material out of each nozzle, and upon the lift or return of the box G the upper plate, $c'$, of the compressing-chamber X rises, thus effecting, first, a stoppage of flow, and, secondarily, an exhaustion, caused by the elongation of the compressing-chamber X. This elongation is assisted by four springs, $g''$, located between the upper and lower plates of the compressing-chamber, and the exhaustion in the compressing-chamber X causes the outside air to enter into the nozzles, breaking the connection of the nozzles and material deposited upon the cakes. After the connection is thus broken by the atmospheric pressure the nozzles lift away from the cakes far enough for them to pass from under, when the motion of the sectional belt O moves them forward and brings another row of cakes to be ornamented, as before.

It will be seen that the relative positions of the cakes and nozzles are not altered, and that they do not separate from each other in breaking the connection of the material, the lift of the nozzles having no relation to the separation, but only allowing the cakes to pass clear of them. The chamber G has the usual piston or follower, $d$, to take up the displacement of the material as it is used out of the box. The follower $d$ is worked by two screws, $d''$, entering into the screw-chamber $d'$, and actuated by means of the bevel-gears $e e'$. The two screws are mounted in yokes $g$, which swing upon the upper shaft, $f$. The yokes $g$ answer the double purpose of holding the screws and miter-gears in line with each other, also enabling the plunger or follower $d$ and connections to swing to one side when lifted clear of the material-box.

Upon the shaft $f$, on one end, is a hand-wheel, $f'$, for working the plunger or follower out of the material-box G by hand, and upon the other end of this shaft $f$ is a ratchet-wheel, $f''$, upon the inside of which, suspended upon the shaft $f$, is a swinging arm, $h$, having a pawl, $l''$, working upon its end, which engages with the teeth of the ratchet-wheel $f''$.

Attached to the same stud as the pawl $l''$ is a connecting feed-rod, $h'$, Fig. 4, extending down and passing through a projection, $g'''$, attached to the material-box G, and then through a second projection, $g^4$, fastened to the side of the frame A. Upon this feed-rod, above the projection from the material-box G, is fastened a collar, $b$, under which and resting against the projection $g^3$ is a spring, $h^2$.

Upon the extreme lower end of the feed-rod $h'$ is a hand-nut, $h^3$, working with a screw motion upon the rod, and by screwing up this hand-nut it shortens the feed-rod and renders the motion upon the ratchet-wheel $f''$ greater or less as the hand-nut is made to lengthen or shorten the feed-rod.

The motion of the material-box G is about one inch, and if the feed-rod is elongated by unscrewing the hand-nut $h^3$, so that it will not come in contact with the projection $g^4$ on the side of the frame A, there will not be any motion transmitted to the ratchet-wheel $f''$; but if the nut is screwed up enough to make it come in contact with the projection at any part of the upper motion of the material-box, with which it travels, the motion of the rod will be stopped, and as the ratchet travels upward it will be turned more or less, according to the location of the hand-nut upon the feed-rod.

The operation of the machine is as follows: The cakes are first placed in the hopper Z', back of the brush R'. Then all the vertical tubes Q are filled with cakes by hand, one on top of another, in a vertical column. The ornamenting material is now placed in the box G, and the follower $d$ is screwed down upon it, pressing it into the compressing-chamber X, which it completely fills. The machine is now started by applying power to the driving-pulleys C' with the following action: The brushes R' R'' R''' swing in unison by the motion transmitted to them by the connecting-rod and crank S' S''', which also impart a jumping motion to the hopper Z'. The cakes, by agitation and brushing, feed down the incline of the hopper Z', and, owing to the different heights of the brushes, are distributed in a single layer at the bottom of the incline, where they slide into the vertical tubes Q, always keeping them filled. The pins upon the belt O take out the cakes $z'$, one at a time, from each tube, as shown in Fig 8 and the projection thereof in Fig. 13, carrying them up under the ornamenting-nozzles Z. The intermittent motion of the belt permits the cakes to rest momentarily beneath the nozzles, and during the period of rest the chamber X is compressed and the deposit of ornamenting material upon the cakes takes place. The expansion of the chamber X then breaks off the connection with the deposit, as described, the box G lifts to avoid possible contact with the cakes, and the belt O resumes its motion. The ornamented cakes are stripped off from the belt O by the stripper-plate W, whose fingers W'' rest in the grooves $o''$, and thus are inserted beneath the cakes. They then slide down the inclined surface of the plate W, as shown in Fig. 9, and pass on to the pans as they are carried under it by the feed motion of the pan-conveyer K. The pans are attached to the conveyer by placing them in under the stripper-plate W, (on the right-hand side thereof in Fig. 1,) the studs $k$ upon the pan-conveyer entering into holes of the pans or trays, and thereby working them forward. After the pans or trays are completely filled they are taken off by hand from the conveyer and placed away for the ornamenting to dry. The action of the stop of the stripper-plate W, before described, will not allow the cakes to be deposited upon the rim or edge of the pan, which is usually a rib of heavy wire, as indicated at $z''$ in Fig. 9, and thus, with the exception of supplying the hopper Z' and removing the filled pans, all the operations are automatically performed.

Having thus described the nature and objects of my invention, what I claim herein as new, and desire to secure by Letters Patent, is—

1. In a machine for ornamenting cakes, &c., the combination, with the carrying and ornamenting mechanism, of a hopper and means for agitating the same, substantially as set forth.

2. The combination of the hopper with the upright feeding-tubes, substantially as set forth.

3. The combination of the hopper and its perforated bottom with a subjacent dust-receptacle, substantially as and for the purposes set forth.

4. The combination, with the hopper, of a series of graduated brushes arranged and operating substantially as set forth.

5. The combination, with the carrying-belt, of a series of receptacles arranged thereon and open in the direction of the belt's travel, substantially as set forth.

6. The carrying-belt having longitudinal grooves, substantially as and for the purposes set forth.

7. The combination of the carrying-belt, the receptacles arranged thereon and open in the direction of the belt's travel, and the feed-tubes having fingers which depend below the top of said receptacle, substantially as set forth.

8. The combination of the longitudinal grooves of the carrying-belt with the feed-tubes, having pendent fingers, which extend into the said grooves, substantially as set forth.

9. The combination of the ornamenting-nozzles, the carrying-belt, and the receptacles thereon, of substantially angular form, the apexes of such receptacles being arranged in lines which travel beneath said nozzles, whereby cakes of various diameters will be centered upon said lines in the manner set forth.

10. The combination of the ornamenting-nozzles, the carrying-belt, the receptacles arranged thereon at regular longitudinal intervals, the belt-driving pulley, the pawl-and-ratchet device, whose stroke corresponds with said intervals, and adjusting mechanism, whereby the commencement and conclusion of said stroke may be varied with reference to the position of the said receptacles, substantially as and for the purposes set forth.

11. The combination, with the grooved carrying-belt, of the stripper-fingers, which project into said grooves, substantially as and for the purposes set forth.

12. The combination, with the stripper-plate, of the stop-fingers pivoted thereto and adapted to be raised by contact with the rim of the pan traveling beneath, whereby the discharge of the cakes upon said rim is prevented, substantially as set forth.

J. HENRY MITCHELL.

Witnesses:
J. WALTER DOUGLASS,
WILLIAM W. FARR, Jr.